US008925028B2

(12) United States Patent
Talbert et al.

(10) Patent No.: US 8,925,028 B2

(45) Date of Patent: Dec. 30, 2014

(54) AUTO RECONCILIATION

(75) Inventors: Michael John Talbert, Nazareth, PA (US); Frances Stevens Bowes, Washington Crossing, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 766 days.

(21) Appl. No.: 12/965,263

(22) Filed: Dec. 10, 2010

(65) Prior Publication Data

US 2012/0151512 A1 Jun. 14, 2012

(51) Int. Cl.
*H04N 7/173* (2011.01)
*H04H 60/32* (2008.01)

(52) U.S. Cl.
CPC .................................... *H04H 60/32* (2013.01)
USPC .............................. 725/132; 725/14; 725/134

(58) Field of Classification Search
CPC .................... H04N 21/4424; H04N 21/44245; H04N 17/04
USPC ........ 725/9–21, 107, 132, 134; 713/176–179, 713/181; 726/27, 30, 34
See application file for complete search history.

(56) References Cited

U.S. PATENT DOCUMENTS

| | | | | |
|---|---|---|---|---|
| 5,003,591 | A * | 3/1991 | Kauffman et al. | 380/232 |
| 5,999,623 | A * | 12/1999 | Bowman et al. | 380/239 |
| 7,739,717 | B1 * | 6/2010 | Kuether et al. | 725/107 |
| 2004/0093370 | A1 * | 5/2004 | Blair et al. | 709/200 |
| 2005/0044562 | A1 * | 2/2005 | Dauvois | 725/25 |
| 2009/0089854 | A1 * | 4/2009 | Le et al. | 725/139 |
| 2009/0300773 | A1 * | 12/2009 | Pal | 726/27 |
| 2011/0099527 | A1 * | 4/2011 | Courchesne et al. | 716/100 |
| 2011/0099597 | A1 * | 4/2011 | Boatright et al. | 725/107 |

* cited by examiner

*Primary Examiner* — Benjamin R Bruckart
*Assistant Examiner* — Carmine Malangone

(57) ABSTRACT

A set-top box includes a baseline record with information regarding the expected environment of the set-top box. The baseline record may be encrypted, and may include locational information. The set-top box compares the expected environment to an actual environment of the set-top box and attempts auto-reconciliation if the comparison indicates a discrepancy. In some implementations, auto-reconciliation includes performing a check of the components of the set-top box to identify improper performance. In some implementations, auto-reconciliation includes the enabling of missing entitlements or the disabling of extra entitlements.

A computing device of a media content provider includes a golden source record with information establishing the expected environment for the set-top box. The media content provider may send updates for the baseline record when information in the golden source record changes. In some implementations, during auto-reconciliation a comparison is made between the golden source record and the baseline record.

21 Claims, 7 Drawing Sheets

AUTO RECONCILIATION

BACKGROUND

The advent of computers, electronic communication, and other advances in the digital realm of consumer electronics has resulted in a great variety of enhanced programming, recording, and viewing options for users who view media content such as television programs. In implementing such enhanced options, the set-top box (STB) has become an important computing device for accessing media content services. In addition to supporting traditional broadcast television, STBs also support an increasing number of services such as video-on-demand, internet protocol television (IPTV), and personal video recording. An STB is typically in communication with a media content provider and configured to provide users with media content based on a subscription with the media content provider. For example, a user may choose to become a subscriber by purchasing one or more available services from a media content provider, including various television programming packages, pay-per-view services, video-on-demand services, Internet services, telephone services, and audio programming. Generally, a media content provider determines which services to provide to an STB based on a subscription, for example according to information stored in a billing system.

Under certain circumstances, an STB may not provide the correct services for which the subscriber is entitled. Action is required to reconcile the STB in order to provide the correct services based on the associated subscription.

DETAILED DESCRIPTION

Figure 1:
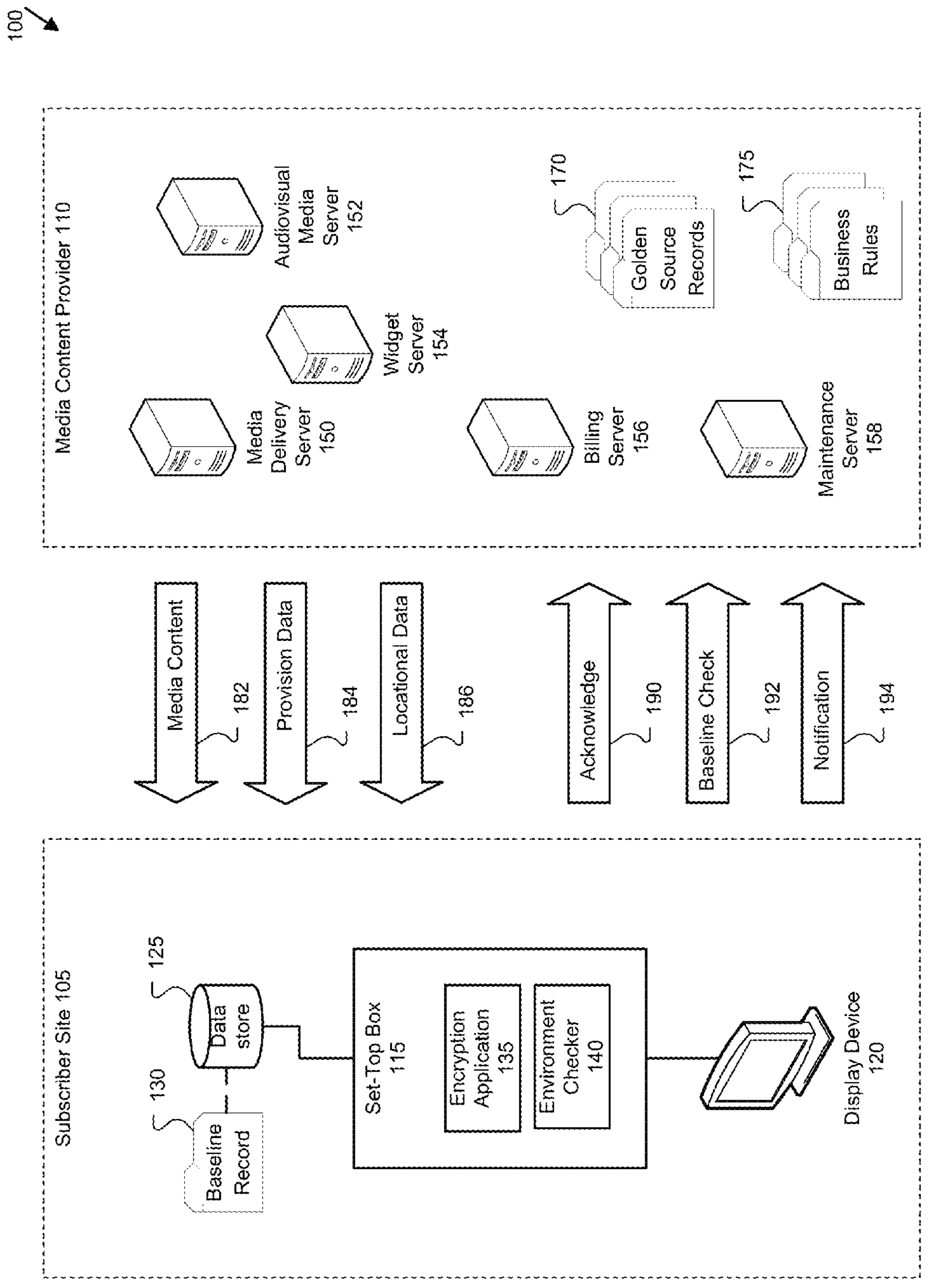
FIG. 1 illustrates an exemplary system for enabling STB auto-reconciliation.

In current systems, when media content is not provided by an STB according to a subscription, the subscriber must notify a representative of the media content provider that there is a problem. The representative may attempt to correct the problem remotely, for example, by forcing a reset of the STB or by enabling a particular channel to be delivered to the STB. If the representative is not able to determine the problem from the subscriber's description or is not able to correct the problem remotely, then a technician may be dispatched to the location of the STB to make repairs or otherwise correct the problem. The total cost to the media content provider may be significant when a subscriber reports a problem: there may be the costs of the representative's time, the technician's time, and the cost of replacement parts whether replaced necessarily or unnecessarily. Further, there are intangible costs associated with the subscriber's displeasure in not getting the correct service according to the subscription, displeasure in having to call the problem in, and displeasure in having to wait for and put up with a technician.

To reduce costs and inconvenience related to discrepancies in subscriptions versus the media content to be provided, it would be desirable for an STB to identify and correct a discrepancy before the subscriber is even aware that there is such a discrepancy. A disclosed STB is capable of identifying discrepancies through a self-check and through performing auto-reconciliation with the media content provider to correct discrepancies.

In general terms, auto-reconciliation is a process in which the STB attempts to correct discrepancies between a baseline environment stored in the memory of the STB versus the environment that the STB determines to be actually present. As used herein, environment refers to the operational environment of the STB, including but not limited to signals available at inputs to the STB, equipment attached to the output of the STB, locational information received from the media content provider, locational information received in the media content, available channels, channel maps, and program guide information. Thus, environment includes the characteristics of the location of the STB as well as the entitlements of the subscriber as related to the subscription.

During auto-reconciliation the media content provider reacts to notifications of the STB according to business rules implemented by the provider. Business rules are created by gathering information from a plurality of STBs over a period of time, evaluating which issues recur, and implementing rules for dealing with the recurring issues. Over time as more information is gathered the business rules may be updated or more rules created to address additional issues. As the set of rules grows and is automated within the provider system the cost and inconvenience associated with maintaining the network of STBs should decrease while subscriber satisfaction with the provider should increase.

In addition to cost and time savings related to automatic detection and correction of discrepancies in delivered media content, auto-reconciliation may be used to reduce cost related to misappropriation of equipment and services. For example, if a subscriber takes an STB assigned to the subscriber to another location and attempts to use the STB to receive media content at the other location, the STB may recognize that it has been moved and can take appropriate action. In one example the subscriber moves the STB when the subscriber moves to a new home, and the STB may prompt the subscriber to notify the media content provider of the new subscriber address. In another example, the subscriber takes the STB to a friend's house on game day to watch the game because the friend does not have access to the channel presenting the game. In this example, the STB may offer the subscriber a one-use access to the channel or one-day access to the subscribed services to be received at the friend's house for an additional fee. Other actions may be taken based on the business rules of the media content provider, including but not limited to upgrading or disabling the STB as well as suspending or elevating the subscriber's subscribed services.

Having provided an overview of auto-reconciliation within a media content provider system, an exemplary system for enabling auto-reconciliation is now described.

FIG. 1 illustrates an exemplary system 100 for enabling auto-reconciliation. FIG. 1 will be described in overview first, followed by a detailed discussion of each of the components individually.

System 100 includes one or more subscriber sites 105 provided with media content by a media content provider 110. The term "media content" includes related services and information.

Subscriber site 105 includes a set-top box (STB) 115 that receives media content from media content provider 110 and sends display information to display device 120. Associated with STB 115 is a data store 125 that includes at least a baseline record 130 describing the expected environment of the STB 115. Shown included within STB 115 are an encryption application 135 and an environment checker 140. Encryption application 135 encrypts baseline record 130 to prevent modification by unauthorized persons attempting to receive entitlements that are not part of the subscription or attempting to relocate the STB in an unauthorized manner. Environment checker 140 checks the STB 115 environment and compares the environment to baseline record 130, for example at power-up and periodically.

Media content provider 110 generally includes a large network of equipment necessary for delivering stores of media content to scores of subscribers. FIG. 1 presents servers 150-158 as representative of some of the functionality of provider 110 and not as a limitation on implementing a provider 110 network. Server 150 represents at least the function of gathering media content, for example from audiovisual media server 152 or widget server 154, and providing the media content to subscriber site 105. Server 156 represents at least the function of compiling and maintaining subscription information and billing subscribers for subscribed media content. Server 158 represents at least the function of compiling and maintaining equipment records and service requests.

Also shown as part of media content provider 110 are a set of golden source records 170 and a set of business rules 175. For each activated STB 115 at a subscriber site 105 there is a corresponding golden source record 170 describing the expected environment for the STB 115. If there is a discrepancy between information related to an STB 115 anywhere within the provider 110 network or the STB 115, the information in the golden source record 170 related to that STB 115 is used as the true information. Business rules 175 describe how provider 110 responds to discrepancies.

Information exchanged between subscriber site 105 and media content provider 110 includes information 182, 184, and 186 from provider 110 to site 105; and information 190, 192, and 194 from site 105 to provider 110. Provider 110 provides subscribed media content 182, provision data 184 such as which channels will be available to STB 115, and locational data 186 such as in which region STB 115 is located. STB 115 sends to provider 110 acknowledgments 190 of successful provisioning, requests for baseline checks 192, and notifications 194 of STB 115 status.

With this overview in mind, details of the components of exemplary system 100 are now presented. The exemplary components illustrated in FIG. 1 are not limiting and additional or alternative components and/or implementations may be used.

Subscriber sites 105 each include at least one STB 115 configured to communicate with media content provider 110. STB 115 and media content provider 110 may be configured to communicate with each other via one or more types of networks and communications links with appropriate protocols. Exemplary networks may include the Internet, an intranet or other private packet-switched network, a cable television network (e.g., a hybrid fiber-coax network), a wireless broadcast network (e.g., a satellite media broadcasting network or terrestrial broadcasting network), a telephone network, a provider-specific network (e.g., a Verizon® FIOS® network), an optical fiber network, or any other suitable network.

STB 115 may include a communication interface configured to receive media content 182 from media content provider 110. Media content may include but is not limited to video programs, Internet content, program guides, music, interactive content, sales information, search capability, and games. Media content may be owned by entities other than media content provider 110.

STB 115 may further include an interface configured to receive input commands from a user input device. The user input device may include, for example, a remote control, keyboard, or any other suitable input device and may be configured to communicate with STB 115 via a wireless link (e.g., an IR link), electrical connection, or any other suitable communication link.

In some examples, a remote control device may be configured to enable a user to provide various commands and other input signals for controlling various settings and operations of STB 115, including control options related to the viewing of media content 182. For example, rewind and fast-forward buttons may enable a user to access different scenes or frames within media content 182 stored in a live cache buffer. A record button may also be included that enables each user to designate as permanently recorded any instance of media content 182 buffered in the live cache buffer. A pause button may enable the user to pause an instance of media content 182. A program guide button may be configured to evoke the display of a program guide on display device 120. Directional buttons, such as "left arrow", "right arrow", "up arrow", and "down arrow" buttons may be included and configured to enable the user to navigate through various views and menus displayed on display device 120 via STB 115.

STB 115 may be configured to process media content 182 provided by media content provider 110 and provide a signal to a display device 120. Display device 120 may include, but is not limited to, a display screen, a television, computer monitor, handheld device, speaker, or any other device configured to present media content. Display device 120 may receive and process output signals from STB 115 such that content of the output signals is received for experiencing by a user. Presentation of media content 182 may include, but is not limited to, displaying, playing back, or processing media content 182 or one or more components of media content 182 such as sound or video.

STB 115 may be a computing device employing any of a number of computer operating systems. Examples of computing devices include, without limitation, a computer workstation, a server, a desktop, notebook, laptop, or handheld computer, or some other known computing system and/or device. Computer operating systems include, but by no means are limited to, versions and/or varieties of the Microsoft Windows® and Windows Phone operating systems, the Unix operating system (e.g., the Solaris® operating system distributed by Sun Microsystems of Menlo Park, Calif.), the AIX UNIX operating system distributed by International Business Machines of Armonk, N.Y., the Mac OS X and iOS operating systems distributed by Apple Inc. of Cupertino, Calif., the BlackBerry OS distributed by Research In Motion of Waterloo, Canada, the Linux operating system, and the Android operating system developed by the Open Handset Alliance.

Computing devices generally include computer-executable instructions and one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other information may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Data store 125 and other databases or data repositories such as described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

Data store 125 may include cached or stored media content 182 and configuration information for STB 115. Data may be written to and read from data store 125 by applications within STB 115. Media content provider 110 may also write to and read from data store 125, for example by sending information to a memory access application in STB 115 that writes the information to data store 125.

Baseline record 130 is stored in data store 125 and may be in the form of a file, a string of bits in memory, a database, or any other form suitable for storage in data store 125. Baseline record 130 is created after STB 115 installation and initialization. Record 130 may be created by media content provider 110 and transferred to STB 115 for storage in data store 125. Alternatively, information received from media content provider 110 may be entered by STB 115, for example into a baseline template stored in data store 125.

Baseline record 130 includes information regarding the environment of STB 115. Environment information may include, for example, information regarding the functional health of STB 115, hardware and software versions of components of STB 115, communication interfaces enabled on STB 115, channel maps, entitlements such as channels included in the subscription, an STB 115 identifier, security codes, and location information such as region or neighborhood or even site 105. Because baseline record 130 includes information confidential to media content provider 110, record 130 may be encrypted before it is stored, as discussed below.

As a subscription changes or as media content provider 110 changes, environment information included in baseline record 130 may also change. When the environment information changes, media content provider 110 notifies STB 115 of the change and STB 115 updates baseline record 130 to reflect the change. Additionally, STB 115 may take steps necessary to effectuate the change. Creating and updating baseline record 130 and effectuating changes will be discussed below in relation to FIG. 2.

Applications 135 and 140 are included in STB 115 and may be stored in data store 125. An application is one of or a combination of hardware, firmware or software and generally is a mechanism for performing one or more actions based on information or instructions received. Applications other than 135 and 140 may also be included in STB 115, for example applications for media transfer and caching, or for updating STB 115.

Encryption application 135 is an application in STB 115 that includes an encryption algorithm for encrypting electronic information. Application 135 may be used to encrypt baseline record 130 before storage in data store 125 to protect the information included in record 130 from access by unauthorized persons. For example, if record 130 were accessible to any user, then a subscriber or other user would be able to add channels at will without paying for the additional channels. Encryption application 135 may also decrypt record 130 to make updates to record 130, or to allow record 130 to be used by other applications within STB 115. Encryption application 135 may be accessed by other applications, for example to encrypt particular media content to limit distribution of the media content.

Environment checker 140 is an application within STB 115 that accesses baseline record 130. As STB 115 is powered on, checker 140 accesses baseline record 130 from data store 125, or accesses information from baseline record 130 through encryption application 135 after decryption. Environment checker 140 performs a self-check of STB 115, comparing the current environment with the environment described by baseline record 130 to look for discrepancies. As part of the self-check, checker 140 may perform a self-health-check of STB 115 to determine whether STB 115 is performing as expected. In addition to or alternatively to performing a self-check at power-up, environment checker 140 may perform a self-check periodically, for example weekly or monthly, even if there are no discrepancies found during self-checks at power-up.

Environment checker 140 may further occasionally compare baseline record 130 to the associated golden source record 170 to ensure that each STB 115 is properly updated according to subscription and system changes. However, a comparison to golden source record 170 uses a certain amount of bandwidth in the network associated with media content provider 110. When system 100 includes many subscriber sites 105 with one or more STBs 115, the bandwidth used by the STBs 115 to perform comparisons to golden source records 170 could overwhelm the resources of media content provider 110. A system 100 with STBs 115 configured for self-check and auto-reconciliation thus may rely on the self-checks and auto-reconciliation to achieve reduced costs without over-burdening the media content provider 110 resources.

To reduce traffic on the media content provider 110 network related to auto-reconciliation, environment checker 140 may be configured to communicate with intermediate or local equipment in the network when applicable. In one illustrative exemplary system 100, media content is delivered in a hierarchical manner: a super headend provides media content to a network of hubs; each hub provides media content to a network of service centers, which in turn provide media content to subscriber sites 105. In this example, environment checker 140 may communicate with the service center associated with the subscriber site 105 to resolve discrepancies found in the comparison of the current environment with baseline record 130. This keeps communication local so that it does not load down the larger network. Continuing with the example, environment checker 140 may communicate with the hub associated with subscriber site 105 only if discrepancies are not resolved by communicating with the service center. Environment checker 140 may be configured to communicate with any of the components in the media content provider 110 network including the headend but may be limited communication to only a few components in the network to limit network traffic.

When environment checker 140 communicates with components in the media content provider 110 network, business rules 175 dictate how the components in the network respond to allow STB 115 to auto-reconcile itself. Examples of communications between environment checker 140 and components in the network are provided throughout the discussions below.

Returning to the discussion of details of FIG. 1, media content provider 110 includes multiple components and may be implemented across one or more networks. FIG. 1 illustrates that media content provider 110 includes multiple servers 150-158. Servers 150-158 represent computing resources such as computing devices as described above. Servers 150-158 include various applications for the gathering and delivering of media content, for keeping the network(s) operating, and for organizing the business of media content delivery, to name a few. Each server as illustrated in FIG. 1 may represent a network of computing devices including hardware, firmware, software, and interconnecting transmission media.

Media delivery server 150 is representative of the media content delivery system. Server 150 may represent multiple layers of components, such as the headends, hubs, and service offices of the example above. Although server 150 is illustrated as part of media content provider 110, components of the media delivery system represented by server 150 may be owned and/or operated by entities other than provider 110.

In addition to media content delivery, media delivery server 150 gathers media content for delivery. Audiovisual media server 152 and widget server 154 are shown in FIG. 1 merely as illustrative examples of sources of media content. Widgets are typically small downloadable applications, for example an application for assembling a photo album from digital photos, or an application for maintaining a personalized calendar of events. Some or all of the media content delivered by media delivery server 150 may be owned and/or stored by multiple entities other than provider 110. Thus, audiovisual media server 152 and widget server 154 may each actually represent a large number of repositories.

Billing server 156 represents subscription organization and maintenance. Media delivery server 150 delivers media to a subscriber site 105 if authorized by the subscriptions for the site 105. Subscriptions may include access to a package of television and radio channels, access to certain specialty channels, internet access, video-on-demand services, etc. After an account is set up for a subscriber, including a list of subscribed services, billing server 156 may notify media delivery server 150 what services may be provided to subscriber site 105. If the subscriber later requests additional or fewer services, the subscriber's account is updated in billing server 156 to reflect the changed subscriptions and billing server 156 may send update information to media delivery server 150.

Billing server 156 may be computing resources at one location or multiple locations. For instance, billing server 156 may be computing resources distributed across the media content provider 110 network such that each subscriber's information is physically stored in a computing device within a geographic region encompassing the corresponding subscriber site 105.

Maintenance server 158 represents the computing resources used to log maintenance requests and reports for the components of system 100 including STBs 115. Maintenance requests and reports may be received in paper form or electronically and may be received through human input or automatically from a machine. Server 158 may also perform analyses of the requests and reports logged, for example to determine trends and identify at-risk devices. Maintenance server 158 may be in communication with billing server 156 to verify that maintenance requests relate to subscribed services. Server 158 may further be in communication with media delivery server 150 or other components within the media content provider 110 network to determine if there are, for example, network outages that explain particular maintenance requests.

In addition to servers 150-158 representing computing resources and network components of media content provider 110, FIG. 1 illustrates some information that is stored within media content provider 110. Specifically, golden source records 170 and business rules 175 are shown.

Golden source records 170 represent information stored within media content provider 110 describing subscriptions for subscriber sites 105 with at least one STB 115. A record 170 may be stored as an individual file, as entries stored across multiple files, as data within a file including multiple records 170, in object form, or in any other manner for storing information. A golden source record 170 includes at least some of the types of information included in the corresponding STB 115 baseline record 130. Golden source records 170 are used to correct the information in baseline records 130, and thus generally will be the most accurate records of media content provider 110. The most accurate records of media content provider 110 are generally the records maintained by billing server 156, because billing server 156 records are at least partially vetted by the subscribers who are paying the bills based on the records. Thus, golden source records 170 will generally be, though not necessarily, stored in the computing resources of billing server 156.

Business rules 175 represent one or more sets of rules describing the operation of media content provider 110. A set of rules could describe how billing server 156 communicates with media delivery server 150 to limit services provided to subscriber sites 105 according to the corresponding subscriptions. Another set of rules could describe how maintenance server 158 queries the equipment of media content provider 110 and STBs 115 for state of health or other information, or how maintenance server 158 communicates with billing server 156 to determine whether a service request is for subscribed services. Other rules could describe how communications from STBs 115 are routed and handled within media content provider 110.

Business rules 175 may be stored in one place within media content provider 110, may be copied to multiple locations across media content provider 110, or individual rules may be distributed across media content provider 110. As operation information is gathered, more rules may be defined and implemented to address recurring situations. For a system using auto-reconciliation STBs 115, information may be gathered from notifications and other communications of the STBs 115. The information may be analyzed manually by humans or electronically using algorithms on computing devices. The business rules defined from the information may be rules for humans to follow, or may be rules followed by media content provider 110 with little or no human intervention. To reduce costs to a minimum media content provider 110 may evolve such that a large percentage of auto-reconciliation may be handled with limited to no human intervention. In this scenario, STBs 115 at subscriber sites 105 would recognize discrepancies of the actual environment compared to the baseline record 130 and fix the discrepancies without human intervention and without subscribers being aware that the discrepancies existed. If a subscriber is made aware of a discrepancy and must participate in its resolution, it is still preferable to minimize the need to involve other individuals outside of the subscriber site 105 to resolve it.

Information exchange between media content provider 110 and subscriber site 105 as represented by exemplary exchanges 182, 184, 186, 190, 192, and 194 will be described in the context of the examples illustrated in FIGS. 2-7.

Having described a system 100 with reference to the exemplary implementation of FIG. 1, exemplary processes are now presented for use of a system 100 that includes auto-reconciliation STBs 115.

Figure 2:
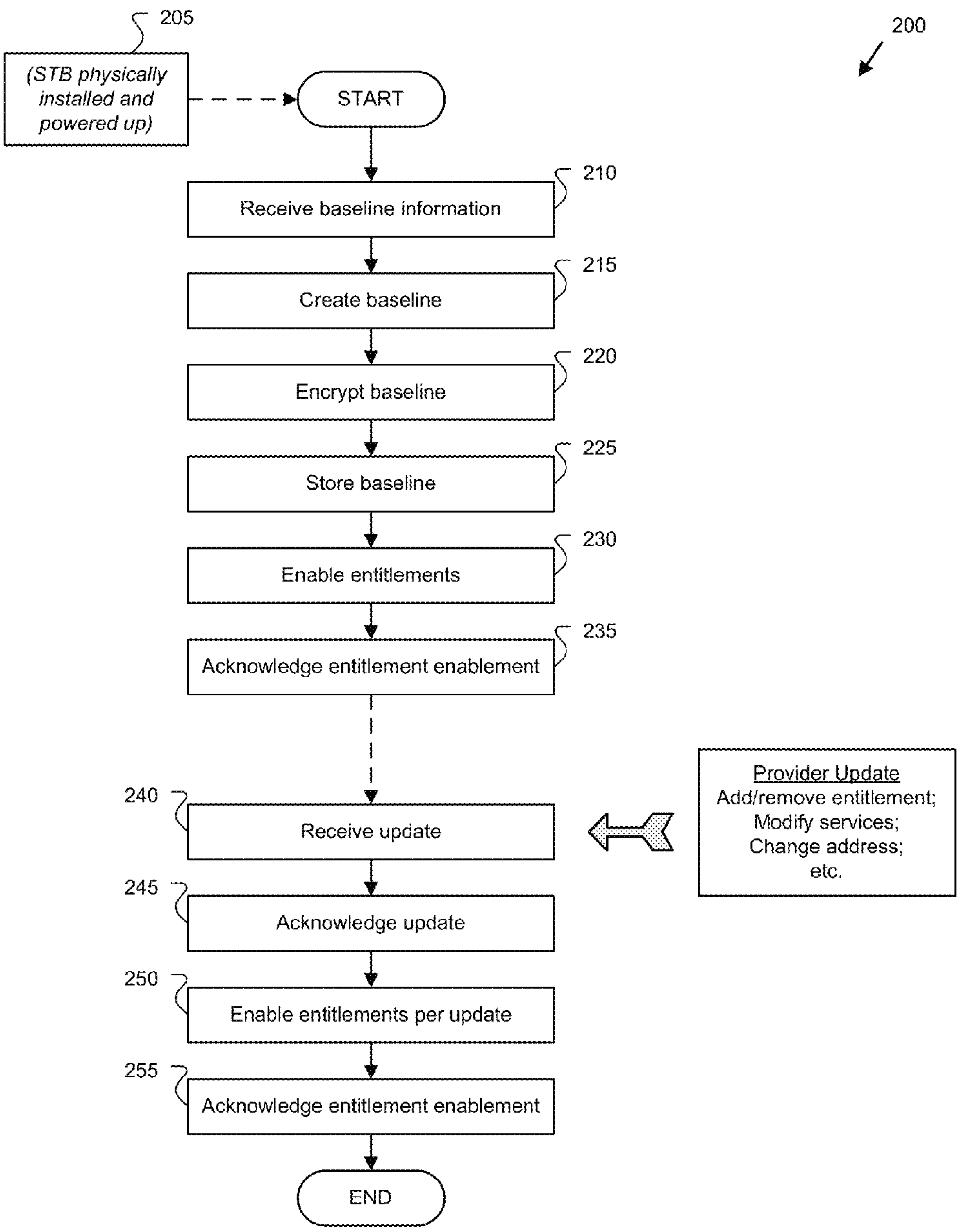
FIG. 2 illustrates an exemplary process for creating and updating a baseline record.

FIG. 2 illustrates an exemplary process 200 for creating and updating a baseline record 130. Process 200 begins after an STB 115 is physically installed in a subscriber site 105 and has been powered up as indicated in note 205.

At block 210, baseline information is received by the STB 115, by a technician installing STB 115, or by a component of media content provider 110. Baseline information includes expected environment information as described above. The types of environment information included in a baseline record 130 may vary between STBs 115, for example information may vary between regions, between STB 115 hardware revisions, or between classes of service. Baseline information may include more or less information than is included in the corresponding golden source record 170.

In an implementation in which STB 115 gathers expected environment information, STB 115 may receive provisioning and locational information from media content provider 110, as represented in FIG. 1 by provision data 184 and locational data 186, respectively. Provision data 184 includes information regarding subscribed entitlements and a "provisioned STB" has all subscribed entitlements enabled. The term "entitlements" herein refers to types of media content included in the subscription and delivered by media content provider server 150, such as channel packages, premium channels, Internet access, Internet television, interactive programs, and the like. Locational data 186 describes the virtual and/or physical location of subscriber site 105 in system 100, such as the neighborhood, or such as the relationship to the components of a hierarchical media content provider server 150.

At block 215, the information gathered at block 210 is used to create a baseline record 130 for STB 115. Formatting for baseline records 130 may differ across the set of STBs 115 at subscriber sites 105. In other words, although each STB 115 with auto-reconciliation enabled will include a baseline record 130, the format for baseline records 130 does not need to be uniform. In some implementations, the format for baseline records 130 is uniform across a set of STBs 115 so that a copy of a baseline record 130 may be delivered by any STB 115 to media content provider 110 for analysis. In other implementations, an STB 115 may send only some information from its baseline record 130 to media content provider 110 for comparison purposes, for example STB 115 may send a message indicating that its baseline record 130 shows entitlement to a premium channel. In this latter example, format of baseline record 130 is not essential. However, whether or not actually necessary, it may be desirable to have a standard format for baseline records 130.

At block 220, baseline record 130 is encrypted to restrict access. If STB 115 created the baseline record 130 at block 215, then encryption application 135 on STB 115 may perform the encryption. For implementations in which STB 115 does not create baseline record 130, encryption may be performed by the component creating baseline record 130, or baseline record 130 may be sent to another component within media content provider 110 or to STB 115 for encryption. The encryption may be performed using any known or proprietary algorithm for encrypting digital information. Baseline record 130 may be partially or completely encrypted. It may be advantageous to leave a portion of baseline record 130 unencrypted to be accessible by the subscriber, for example to set preferences.

At block 225, baseline record 130 is stored in data store 125 either by STB 115 or remotely by a component of media content provider 110, including by a component in the possession of the installation technician.

At block 230, entitlements included in baseline record 130 are enabled, for example enabled by the technician, enabled remotely, or enabled by STB 115 by notifying appropriate components of media content provider 110 to turn on the entitlements. As an illustrative example, STB 115 may notify the appropriate service office to enable Showtime for the subscriber site 105. In this example, information regarding the appropriate service office and other components of media delivery server 150 related to subscriber site 105 may be included in baseline record 130.

At block 235, STB 115 acknowledges that the requested entitlements have been enabled. For example, STB 115 recognizes that Showtime is available to subscriber site 105 and sends an acknowledgment to media content provider 110 that the entitlement was enabled. Such an acknowledgment may be registered at billing server 156 to set the billing cycle for the enabled entitlement. An acknowledgment may also be registered at maintenance server 158 and media delivery server 150.

Entitlements may be enabled in one step as illustrated in process 200, or may be enabled in a sequence. As an example, all entitlements may be enabled in sequence in block 230 then all enabled entitlements may be acknowledged in block 235 with one or more acknowledgments 190. As another example, after each entitlement is enabled in block 230, an acknowledgement 190 may be made in block 235. In an implementation using sequential enablement in which acknowledgments are interspersed with enablements, the process of enabling entitlements (block 230) and acknowledging receipt (block 235) continues until all currently subscribed entitlements in baseline record 130 are enabled.

Following block 235, STB 115 has a baseline record 130 and is provisioned with entitlements according to the baseline record 130. At some later time it may be desirable to update baseline record 130 with new information. Updates may be necessary due to subscriber-initiated changes. For example, the subscriber may elect to change the subscription, either adding or removing entitlements. As another example, the subscriber may move to a new subscriber site 105 and may elect to use the services of media content provider 110 at the new site 105 with the STB 115 from the previous site 105. Additionally, changes within media content provider 110 may require changes to baseline records 130, such as when channels are added to or dropped from the various channel packages, or when subscriber sites 105 are assigned to different service areas of media delivery server 150.

At block 240, process 200 continues following an update when STB 115 receives information regarding an update. Information may be received from any component within media content provider 110 as appropriate. Billing server 156 may provide updates according to changes of subscription or change of service area. Maintenance server 158 may provide updates according to status information requested. Media delivery server 150 may provide updates according to changes in structure of the media delivery component hierarchy such as assignment to a different service office and different hub. The examples given are merely a few examples of the sources and content of update information provided to STB 115. Some update information may be provided as provision data 184 or locational data 186.

Implicit in block 240 is decrypting, updating, encrypting, and storing of baseline record 130.

At block 245, STB 115 acknowledges receipt of update information to the source of the update, and may further provide acknowledgment to other components of media content provider 110. Acknowledgment is indicated in FIG. 1 by the information exchange denoted acknowledge 190. As with all communication from STB 115, recipients of and action related to acknowledgments from STB 115 follow business rules 175.

At block 250, STB 115 requests that entitlements be enabled according to the update if applicable. In some cases, existing entitlements will be disabled. In other cases, new entitlements will be enabled. In yet other cases, the update to baseline record includes no changes of entitlements and involves only a change of baseline record 130.

At block 255, STB 115 acknowledges that the requested entitlement enablement has been performed, as described above. Following block 255, process 200 ends.

If STB 115 for some reason does not send acknowledgments (e.g., in process 200 STB 115 does not send an acknowledgement for the update at block 245 or for enablement of entitlements at block 255), media content provider 110 may take further action according to business rules 175. To illustrate by way of an example, provider 110 may resend the update two more times, and in the absence of acknowledgements may notify maintenance server 158 of a potential problem with STB 115. In this example, maintenance server 158 may communicate with STB 115 to resolve the problem, and if there is no resolution server 158 may open a service ticket for a technician to contact subscriber site 105 for a service visit.

As can be seen from the description above, process 200 may be performed in part or in its entirety in automatic fashion without human intervention. A subscriber may plug in an STB 115 at a subscriber site 105, and then STB 115 may communicate with media content provider 110 to create and store a baseline record 130, provision itself, and make updates as requested.

Figure 3A:
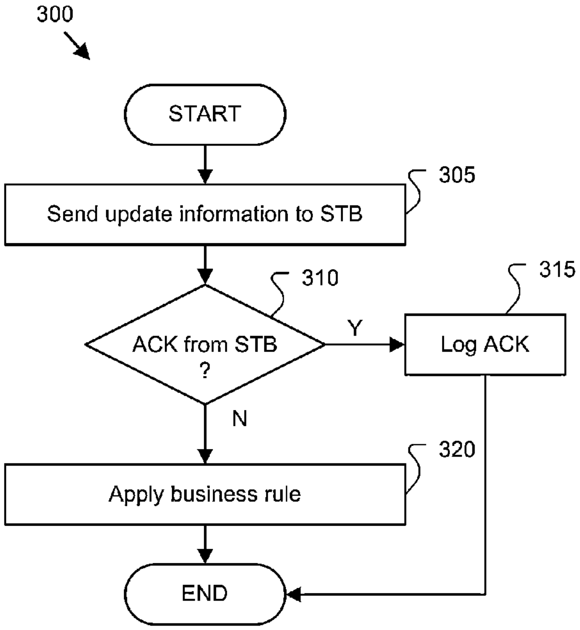
FIG. 3A illustrates from the perspective of a media content provider an exemplary process for sending updates to an STB.
Figure 3B:
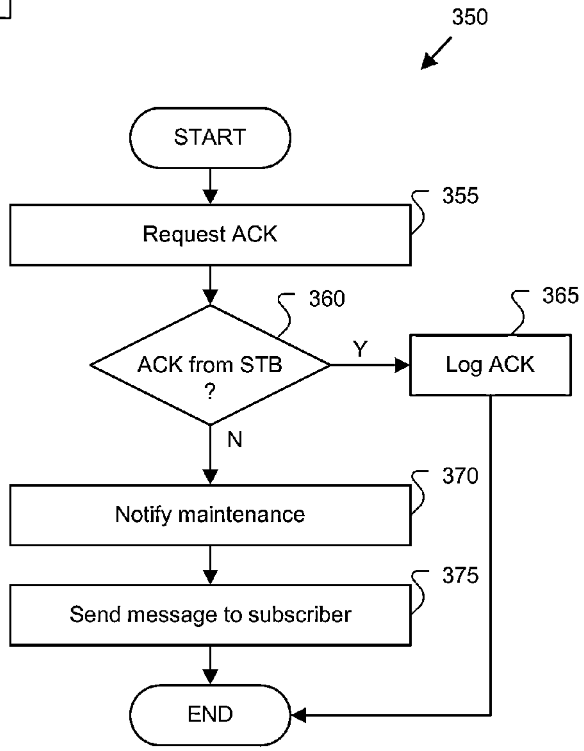
FIG. 3B illustrates from the perspective of a media content provider an exemplary process illustrating following an exemplary business rule for verifying that an update has been received by an STB.

Process 200 illustrated an exemplary process for creating and updating baseline record 130 from the perspective of STB 115. FIGS. 3A and 3B present a change of perspective to that of media content provider 110.

FIG. 3A illustrates from the perspective of media content provider 110 an exemplary process 300 for sending updates to STB 115.

At block 305, a component of media content provider 110, for example a computer in billing server 156 or a hub of media delivery server 150, sends update information to STB 115. At decision point 310, a component of media content provider 110 determines if an acknowledgment was received from STB 115. The determining at block 310 may be performed by the component that sent the update or alternatively may be performed by some other component within media content provider 110. The component may wait for the acknowledgment or poll STB 115 for an acknowledgment. Either way, if an acknowledgment was received, the acknowledgment is logged within media content provider 110 as appropriate to keep a record of the update being received.

If at decision point 310 no acknowledgment was received, at block 320 media content provider 110 follows business rules 175 to determine an appropriate course of actions. An appropriate action may be for example to log the lack of acknowledgment, to open a service ticket for a technician, or to request a phone call from a representative to subscriber site 105.

Following block 315 or 320, process 300 ends.

FIG. 3B illustrates from the perspective of media content provider 110 an exemplary process 350 similar to process 300. Process 350 replaces block 320 of process 300 with an exemplary business rule 175 for verifying that an update has been received by STB 115. In process 350, media content provider 110 polls STB 115 for acknowledgments.

At block 355, media content provider 110 requests an acknowledgement of receipt of an update from STB 115. At block 365, if an acknowledgment is received from STB 115, the acknowledgement is logged within provider 110.

At block 370, if an acknowledgement is not received from STB 115, media content provider 110 follows the appropriate business rule 175 and notifies maintenance. For example, billing server 156 may request the acknowledgment and notify maintenance server 158 if no acknowledgment is received.

At block 375, the exemplary appropriate business rule 175 includes notification to the subscriber. Notification to the subscriber may for example be a message on display device 120 requesting the subscriber to contact the media content provider 110 service department, or an email sent to the subscriber indicating that STB 115 has a problem that cannot be repaired remotely.

Following block 365 or 375, process 350 ends.

Business rules 175 are an important component of media content provider 110 as illustrated by the examples above, and rules 175 evolve as provider 110 evolves.

Figure 4:
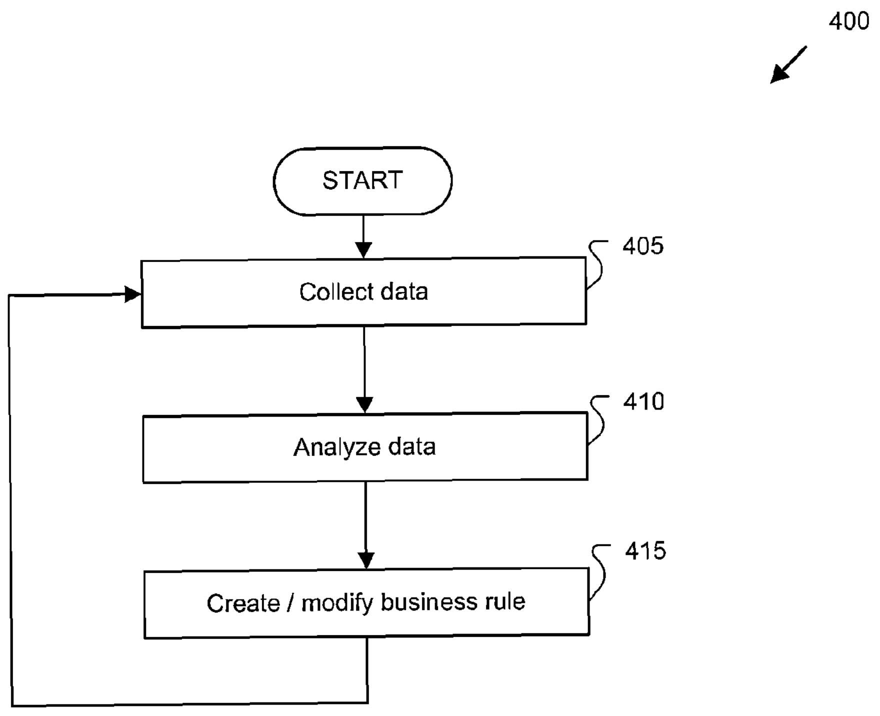
FIG. 4 illustrates an exemplary process for a media content provider to evolve business rules.

FIG. 4 illustrates an exemplary process 400 for media content provider 110 to evolve business rules 175.

At block 405, media content provider 110 collects information from the components of provider 110 and from STBs 115 at subscriber sites 105. Data collected may include problem reports, results of self-health checks and remote health checks, acknowledgments and lack of acknowledgments, notifications, system outages, computing resource failures, and other information regarding the operation of media content provider 110. Data may be collected over a time period or periodically. For example, during the rollout of a new service, provider 110 may collect large quantities of information to gain an understanding of the interrelationship of the components of provider 110 and STBs 115. Then, once a business rule 175 has been created to handle the most-recurring issues related to the new service, information may be collected only periodically or fewer types of information may be collected just to verify that system 100 is operating as expected.

At block 410, media content provider 110 analyzes the information collected at block 405. Analysis may include determining the most-recurring issues, and how those issues are related to the status of various components within provider 110. For example, analysis may indicate that due to system delays it can take up to twenty-four hours for an additional entitlement to be enabled at an STB 115 as compared to the twenty-four minutes expected. Analysis may also include identifying the most costly issues that arise. For example, some issues may require the services of a technician.

At block 415, one or more business rules 175 are created to address the issues identified at block 410. For example, in the case where entitlements take up to twenty-four hours to enable, an appropriate business rule 175 may be that maintenance server 158 is to be apprised of lack of acknowledgement only after twenty-four hours have passed since an update was sent to STB 115. For another example, in the case where technician services are required to address the issues, a business rule 175 may include methods for optimization of a technician's service route.

Following block 415, process 400 ends. However, process 400 is generally an ongoing activity as media content provider 110 seeks to further reduce the costs of doing business and to further improve customer service.

In summary, an STB may be 115 installed and initialized at a subscriber site 105 and includes a baseline record 130 that may be updated remotely. Further summarizing, media content provider 110 communicates with STB 115, and follows a set of business rules for responding to communications or lack of communications from STB 115.

Now is described how an STB 115 configured with auto-reconciliation capability may auto-reconcile baseline record 130, as enabled or limited by business rules 175.

Figure 5:
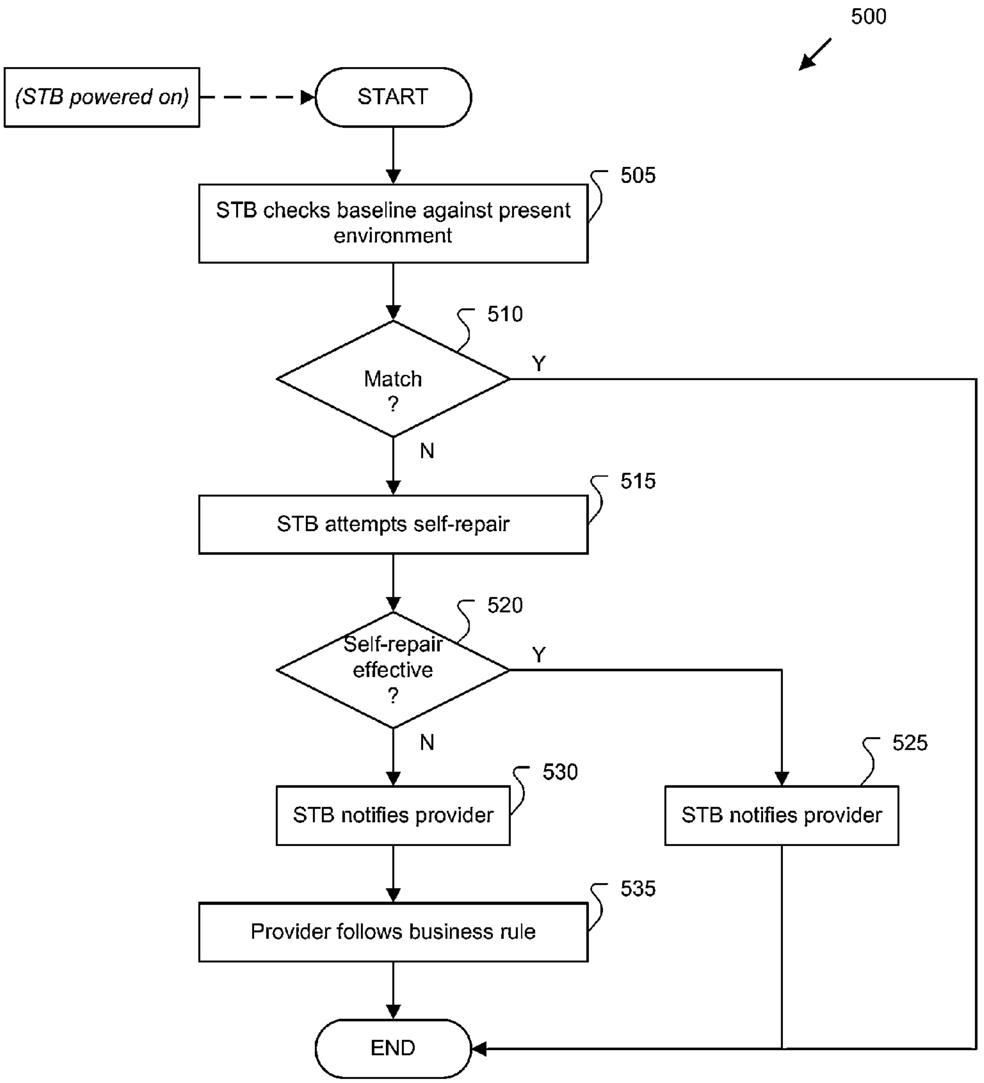
FIG. 5 illustrates an exemplary process for STB self-check and auto-reconciliation.

FIG. 5 shows a flow from the perspective of STB 115, specifically to an STB 115 configured for auto-reconciliation. FIG. 5 illustrates an exemplary process 500 for self-check and auto-reconciliation that STB 115 may perform at power-on or wake-up, and/or periodically. Process 500 begins after STB 115 is powered on. However, power-on may be partial. For example, only the circuits necessary to perform self-check and auto-reconciliation may be powered. Additionally, circuits may be turned on and off as self-check and then auto-reconciliation are performed.

At block 505, STB 115 checks baseline record 130 against the present environment. Implicit in block 505 is the decryption of baseline record 130 and the gathering of information regarding the present environment. For example, STB 115 may scan the physical ports of the hardware to determine which ports are actively receiving a signal. STB 115 may determine which channels and other services are available. STB 115 may further determine from the information received at the input ports the location of the STB 115, such as what hub and service office are used to provide media content to STB 115. In some systems 100, STB 115 may be able to determine its detailed geographic location from the information received, even to the detail of a street address. STB 115 may read its serial number from a memory, or decipher it from a data stream.

Once STB 115 has gathered environment information, the environment information is compared to the information from baseline record 130. The gathering of information and comparing to record 130 may be performed in steps, such that some information is gathered and compared, then additional information is gathered and compared. Alternatively, all information is gathered before comparing.

At decision point 510, if STB 115 compares the environment information to baseline record 130 and all information matches, process 500 ends. STB 115 may notify media content provider 110 of a successful check, not shown. Information regarding successful self-checks may be useful in determining business rules 175, to calculate for example a percentage of the number of times STB 115 starts successfully to understand how often STB 115 errors may be expected. STB 115 may also log successful checks, not shown, to provide a history for maintenance and repair.

At block 515, if there was a discrepancy identified between the environment information and baseline record 130 at decision point 510, STB attempts to perform self-repair as a first step in auto-reconciliation. In one example, STB 115 recognizes that the Showtime channel is not available but is listed as one of the entitlements in baseline record 130. In this example, STB 115 may first check whether an update request was received from media content provider 110 reflecting a change in the subscription to remove Showtime and if so, STB 115 updates baseline record 130 according to the received update request and other new update requests. Continuing with this example, if there was no update request related to Showtime, STB 115 may perform a scan of the hardware to detect improper performance and if there is a problem in the hardware STB 115 may send a maintenance request to maintenance server 158. If there is no hardware problem STB 115 may notify media delivery server 150 that Showtime should be provided to STB 115. For this example, media delivery server 150 may notify STB 115 of an outage, may enable Showtime delivery, may determine that subscriber site 105 is not entitled to Showtime and notify STB 115 of this fact, or may react otherwise, according to a business rule 175.

At decision point 520, STB 115 determines if self-repair was effective, and if so may notify media content provider 110 of successful self-repair at block 525, for example via a notification 194 as illustrated in FIG. 1. Provider 110 may use information regarding successful self-repairs to identify troublesome STBs 115 or areas of poor media content delivery, for example.

At block 525, if STB 115 determines that self-repair was not effective at decision point 520, STB 115 notifies media content provider 110 of unsuccessful self-repair. At block 535 provider 110 follows business rules 175 regarding how to proceed in this case. In some implementations, a business rule 175 may indicate that STB 115 send a copy of baseline record 130 to media content provider 110 for a baseline check, as illustrated by information exchange baseline check 192 of FIG. 1. This business rule 175 will be discussed with respect to FIG. 7, below.

Following block 510 or 535, process 500 ends. As can be understood from the foregoing discussions, an STB 115 configured for self-check and auto-reconciliation can minimize the number of problems that come to the attention of a subscriber, and minimize the number of service calls and technician visits required to maintain STB 115. Thus, the subscriber is happier with the services provided by media content provider 110, and the costs to provider 110 are reduced. Provider 110 further has the benefit of additional health and status information from STBs 115.

Figure 6:
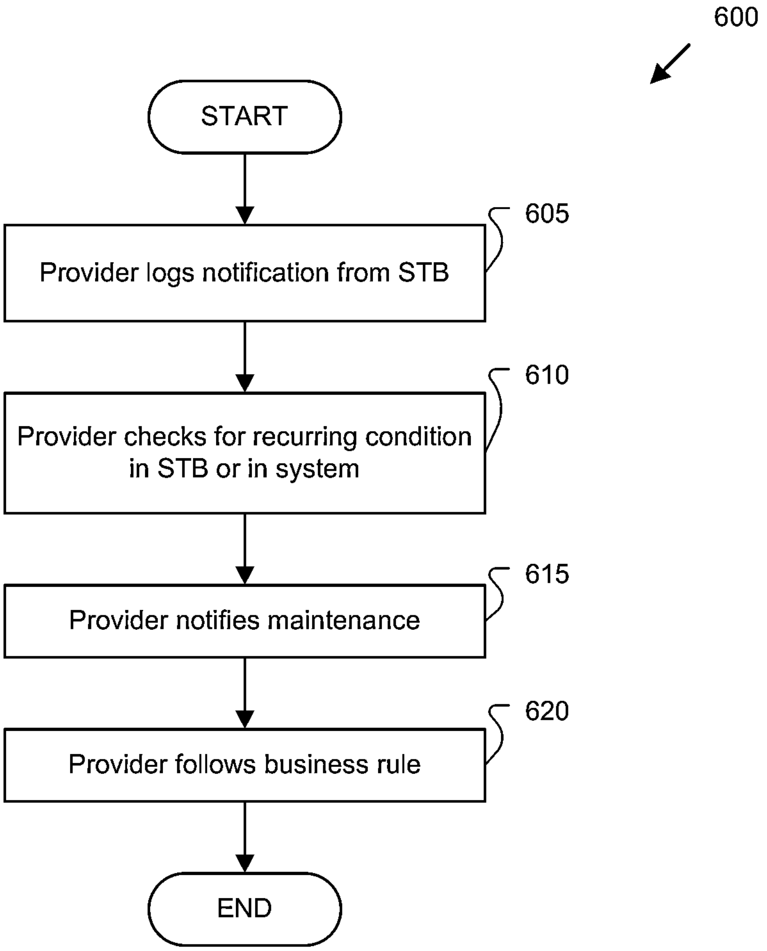
FIG. 6 illustrates an exemplary process for responding to notifications from STBs.

FIG. 6 illustrates an exemplary process 600 for responding to notifications 194 from STBs 115, including using notifications 194 as indications of system health and status.

At block 605, media content provider 110 receives a notification from an STB 115 that an attempted self-repair was ineffective, for example, a notification 194 sent at block 530 in process 500. At block 610, provider 110 checks for recurring conditions related to the notification 194. For the STB 115 sending notification 194, a recurring condition may be that the STB 115 is sending a higher percentage of failed self-repair notifications 194 than successful self-repair notifications 194, indicating perhaps a high-risk STB 115 or faulty cabling to subscriber site 105. A recurring condition of system 100 may be that multiple STBs 115 in a media delivery area are reporting failed self-repairs, indicating that there is a potential issue with media delivery server 150.

At block 615, when recurring conditions are identified maintenance server 158 is notified, and at block 620 media content provider 110 proceeds according to appropriate business rules 175.

Process 600 ends following block 620. Process 600 illustrates that notifications 194 from STBs 115 may be used not only to identify needed STB 115 maintenance but to identify larger system 100 issues.

Returning momentarily to process 500 of FIG. 5, it was mentioned that if a self-repair was unsuccessful, STB 115 may send a copy of baseline record 130 to media content provider 110 for comparison with the corresponding golden source record 170, and provider 110 would react according to business rules 175. Some exemplary business rules 175 related to the comparison of baseline records 130 and golden source records 170 are now presented.

Figure 7:
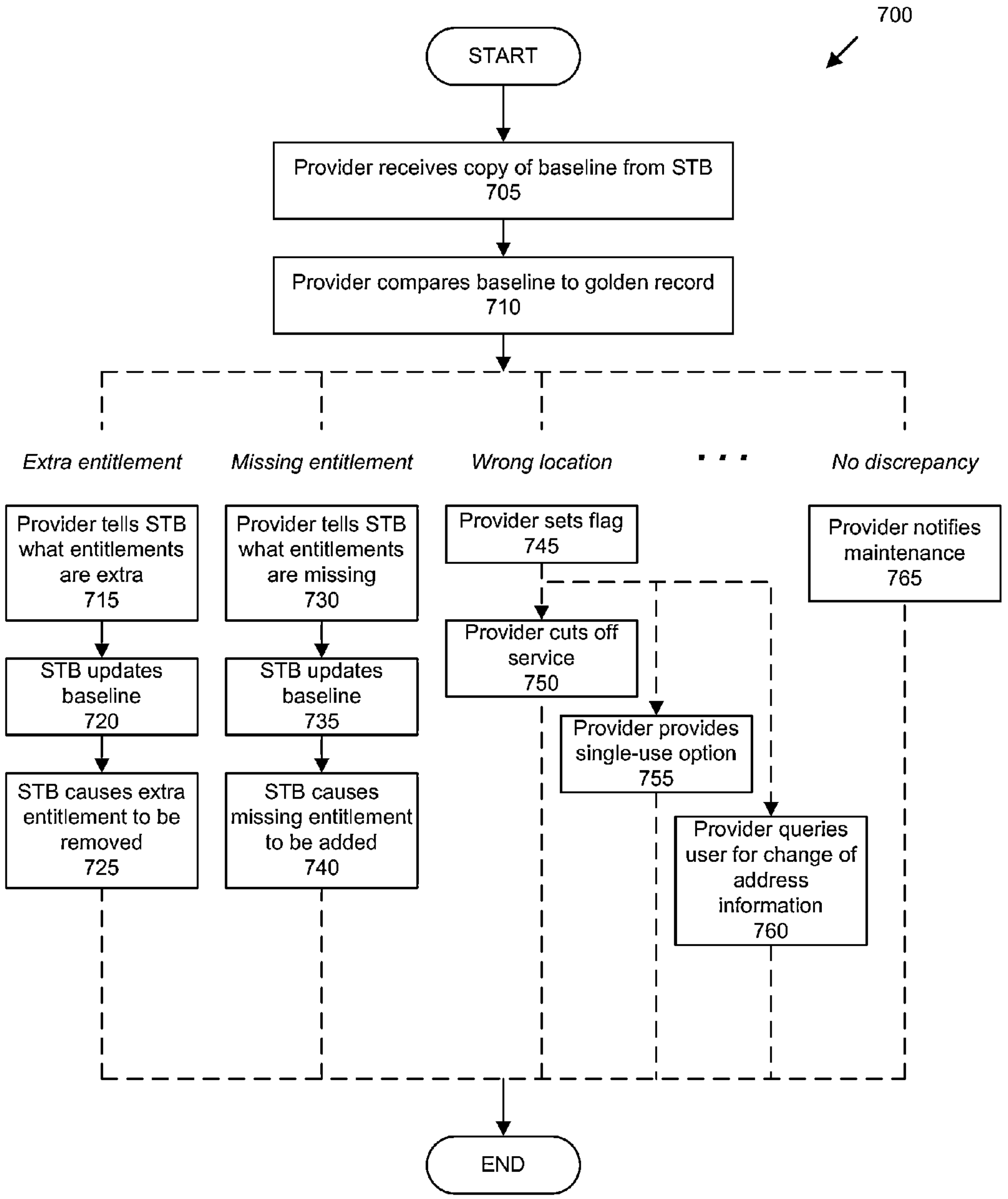
FIG. 7 illustrates a process using exemplary business rules.

FIG. 7 illustrates a process 700 using exemplary business rules 175.

At block 705, media content provider 110 receives a copy of baseline record 130 from STB 115 and at block 710 compares record 130 to the corresponding golden source record 170. Depending on the particular discrepancies between the records, media content provider 110 follows business rules 175 to correct the discrepancies.

At block 715, if the discrepancy is one or more extra entitlements not part of the subscription, media content provider 110 may provide a list of the extra entitlements to STB 115. At block 720, STB 115 updates baseline record 130 to remove the unsubscribed entitlements, and at block 725 causes the unsubscribed entitlements to be removed. For example, STB 115 may notify media delivery server 150 to disable the unsubscribed entitlements. Server 150 may request verification of the removal from billing server 156 before disabling, not shown.

At block 730, if the discrepancy is one or more missing entitlements allowed by the subscription, media content provider 110 may provide a list of the missing entitlements to STB 115. At block 735, STB 115 updates baseline record 130 to add the subscribed entitlements to STB 115. At block 740, STB 115 causes the missing entitlements to be added. For example, STB 115 may notify media delivery server 150 to enable the missing subscribed entitlements. Server 150 may request verification of the addition from billing server 156 before enabling, not shown.

At block 745, if the discrepancy is that STB 115 is in the wrong location, media content provider 110 may set a flag to notify some or all components in provider 110 that STB 115 is operating in a location not allowed by subscription. Business rules 175 may indicate in this case for service to be shut off to subscriber site 105 and/or to the site 105 in which STB 115 is currently located, as noted in block 750. Additionally or alternatively, media content provider 110 may attempt to interact with the subscriber or current user to resolve the location discrepancy. Interaction may be via telephone, email, instant message, a message on a display device 120, or the like. For example, at block 755, provider 110 may provide an option to the subscriber via email for a single program or single day at the unsubscribed site 105 at an extra charge. Or, also at block 755, provider 110 may provide any viewer of display device 120 a single program or single day option by presenting a single-use subscription option at the unsubscribed site 105 for a fee. At block 760, provider 110 may send a query to the subscriber requesting that if there was a change of address that provider 110 be notified. In any case, media content provider 110 may perform multiple actions in response to identifying that STB 115 is in the wrong location.

At block 765, if there is no discrepancy between baseline record 130 and golden source record 170, media content provider 110 may notify maintenance server 158 to follow up and determine why STB 115 is requesting baseline record 130 comparisons when there appears to be no problem.

If multiple discrepancies are identified at block 710, then multiple business rules may be followed sequentially. For example, block 730 may follow block 725, and block 760 may follow blocks 750 and 740. When all discrepancies have been addressed, process 700 ends.

Process 700 describes exemplary business rules for media content provider 110 to follow when STB 115 fails to successfully self-repair and sends baseline record 130 to provider 110 for comparison. In other implementations, media content provider 110 sends a copy of the golden source record 170 associated with STB 115 to STB 115 for comparison with baseline record 130 upon notification of an unsuccessful self-repair. STB 115 then performs the comparison of the records and proceeds according to its programming. For example, STB 115 may correct baseline record 130 and store it, then proceed to enable entitlements according to the corrected baseline record 130.

CONCLUSION

Described above is a set-top box (STB) configured with self-check and auto-reconciliation capability that compares its current environment with the environment described in a baseline record stored in the STB. If there are discrepancies, the STB attempts auto-reconciliation of the baseline record and the environment. During auto-reconciliation, if necessary, the STB may request or perform a comparison of the information in the baseline record to the information in a golden source record of the media content provider and take steps to correct the baseline record if applicable.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A set-top box, comprising:

a baseline record stored in a data store, the baseline record including information regarding an expected environment of the set-top box;

a self-check mechanism configured to gather information regarding an actual environment of the set-top box, compare the actual environment and the expected environment, identify a discrepancy between the actual environment and the expected environment based on the comparison, send a notification to a media content provider that reports the discrepancy, and automatically reconcile the discrepancy based on a communication received from the media content provider and in response to the notification, wherein automatically reconciling the discrepancy includes checking for update information related to the discrepancy within the baseline record; and an update mechanism that receives update information within the communication from the media content provider and updates the baseline record from the update information.

2. The set-top box of claim 1, wherein the actual and expected environments include locational data and the discrepancy is the location of the set-top box.

3. The set-top box of claim 1, wherein the actual environment includes an identification of a current media content provider component providing media content to the set-top box, and the discrepancy is that the current media content provider component in the actual environment is not an expected media content provider component indicated by the baseline record for the expected environment.

4. The set-top box of claim 1, further comprising an encryption mechanism that encrypts the baseline record before the record is stored in the data store, and decrypts the record after the record is read from the data store.

5. The set-top box of claim 1, wherein the actual and expected environments include entitlements of a subscription, and the discrepancy is that the entitlements in the actual environment are different than the entitlements for the expected environment.

6. The set-top box of claim 1, wherein the actual and expected environments include entitlements and the discrepancy is that the entitlements in the actual environment are different than the entitlements for the expected environment, and wherein automatically reconciling the discrepancy includes requesting, via the notification, the media content provider to enable a missing entitlement or disable an extra entitlement.

7. The set-top box of claim 1, wherein automatically reconciling the discrepancy includes performing a self-health check to determine if there is a malfunction of the set-top box prior to checking for the update information.

8. The set-top box of claim 1, wherein automatically reconciling the discrepancy includes sending information from the baseline record to the media content provider for comparison to a golden source record.

9. The set-top box of claim 1, wherein the communication is based on an evaluation of the notification by the media content provider in view of business rules.

10. A method, comprising:

storing a baseline record in a data store related to a set-top box, the baseline record including information regarding an expected environment of the set-top box;

gathering information regarding an actual environment of the set-top box;

comparing the actual environment and the expected environment;

identifying a discrepancy between the actual environment and the expected environment based on the comparing;

sending a notification to a media content provider that reports the discrepancy;

automatically reconciling the discrepancy based on a communication received from the media content provider and in response to the notification, wherein automatically reconciling the discrepancy includes checking for an update related to the discrepancy within the baseline record; and receiving update information within the communication from the media content provider and updating the baseline record from the update information.

11. The method of claim 10, the actual and expected environments including locational data and the discrepancy being the location of the set-top box.

12. The method of claim 10, the actual environment including an identification of a current media content provider component providing media content to the set-top box, and the discrepancy being that the current media content provider component in the actual environment is not an expected media content provider component indicated by the baseline record for the expected environment.

13. The method of claim 12, further comprising encrypting the baseline record before storage in the data store, and decrypting the baseline record after being read from the data store.

14. The method of claim 10, the actual and expected environments including entitlements, and the discrepancy being that the entitlements in the actual environment are different than the entitlements for the expected environment.

15. The method of claim 10, the actual and expected environments including entitlements and the discrepancy being that the entitlements in the actual environment are different than the entitlements for the expected environment, and wherein automatically reconciling the discrepancy includes requesting, via the notification, from the media content provider at least one of an enabling of a missing entitlement and a disabling of an extra entitlement.

16. The system of claim 10, wherein automatically reconciling the discrepancy includes performing a self-health check to determine if there is a malfunction of the set-top box prior to checking for updates.

17. The system of claim 10, wherein automatically reconciling the discrepancy includes sending information from the baseline record to a media content provider for comparison to a golden source record.

18. A system, comprising:

a set-top box;

a data store of the set-top box including a baseline record with information regarding an expected environment;

a self-check mechanism of the set-top box configured to compare the expected environment to an actual environment of the set-top box, identify a discrepancy between the actual environment and the expected environment based on the comparison, send a notification to a media content provider that reports the discrepancy, and automatically reconcile the discrepancy based on a communication received from the media content provider and in response to the notification, wherein automatically reconciling the discrepancy includes checking for update information related to the discrepancy within the baseline record; and a computing device of the media content provider that receives a request from the set-top box to enable an entitlement or disable an entitlement based on the comparison.

19. The system of claim 18, wherein automatically reconciling the discrepancy includes performing a check of the components of the set-top box to identify improper performance.

20. The system of claim 18, the media content provider further comprising a golden source record with information establishing the expected environment for the set-top box, wherein automatically reconciling the discrepancy includes a comparison between the golden source record and the baseline record.

21. The system of claim 18, further comprising an encryption mechanism in the set-top box that encrypts the baseline record prior to storage in the data store and decrypts the baseline record prior to comparing the expected environment to the actual environment.

* * * * *